United States Patent [19]

Toivio et al.

[11] Patent Number: 5,005,233

[45] Date of Patent: Apr. 9, 1991

[54] APPARATUS FOR TRANSFERRING PATIENTS

[76] Inventors: Ikka Toivio; Terttu Tolvio, both of Likolammenkatu 15, SF-15850 Lahti, Finland

[21] Appl. No.: 406,091

[22] Filed: Sep. 12, 1989

[30] Foreign Application Priority Data

Mar. 15, 1989 [FI] Finland ................................ 891231
May 17, 1989 [FI] Finland ................................ 892374

[51] Int. Cl.5 ............................................ A61C 7/10
[52] U.S. Cl. ............................................ 5/83; 5/84; 5/87
[58] Field of Search ............................ 5/81 R, 83-88

[56] References Cited

U.S. PATENT DOCUMENTS 953,962 4/1910 Lane ........................................ 5/87
1,698,754 1/1929 Gadbois .................................... 5/83
1,977,944 10/1944 Haskett .................................... 5/84
2,218,883 10/1940 Jones .................................... 5/81 R
2,683,882 7/1954 Smith ........................................ 5/86
2,873,456 2/1959 Joy ........................................ 5/86 X
3,030,638 4/1962 Verduin et al. ........................... 5/83
3,131,404 5/1964 Bowers et al. ............................ 5/86
3,346,890 10/1967 Thompson ............................... 5/86
3,506,985 4/1970 Lang .
3,905,055 9/1975 Blair ................................ 5/81 R X
3,998,284 12/1976 James .................................. 5/86 X
4,397,051 8/1983 Wheeler .

FOREIGN PATENT DOCUMENTS 3307138 4/1982 Fed. Rep. of Germany .
801688 12/1981 Norway .
341787 11/1970 Sweden .
406037 11/1978 Sweden .
470177 3/1969 Switzerland .

*Primary Examiner*—Michael F. Trettel
*Attorney, Agent, or Firm*—Merchant & Gould

[57] ABSTRACT

The invention relates to an apparatus for transferring patients. The apparatus comprises an elongate support frame (1), which is connected to a bed (2); a couch (3) for the patient; and transfer means for transferring the patient on the couch (3), supported by the support frame (1). According to the invention, the transfer means include a hauling device, which is fitted in between the support frame (1) and the bottom (5) of the bed (2) so that the support frame (1) and the bottom (5) of the bed are essentailly vertically adjustable with respect to each other. Moreover, the support frame (1) is essentially horizontally turnable with respect to the vertical axis (B—B). The apparatus also comprises an auxiliary support (26), which is connected to the support frame (1) so that the auxiliary support is turned along with the support frame (1) when it is turned horizontally with respect to the vertical axis. The couch (3) is attached to the support frame (1) with straps (42) while the apparatus is in operation. The support points of the straps (4) in the support frame (1) are located at intervals from each other, and at least one of the support points is located outside the straight line passing through the two or more other support points.

36 Claims, 9 Drawing Sheets

Fig.4
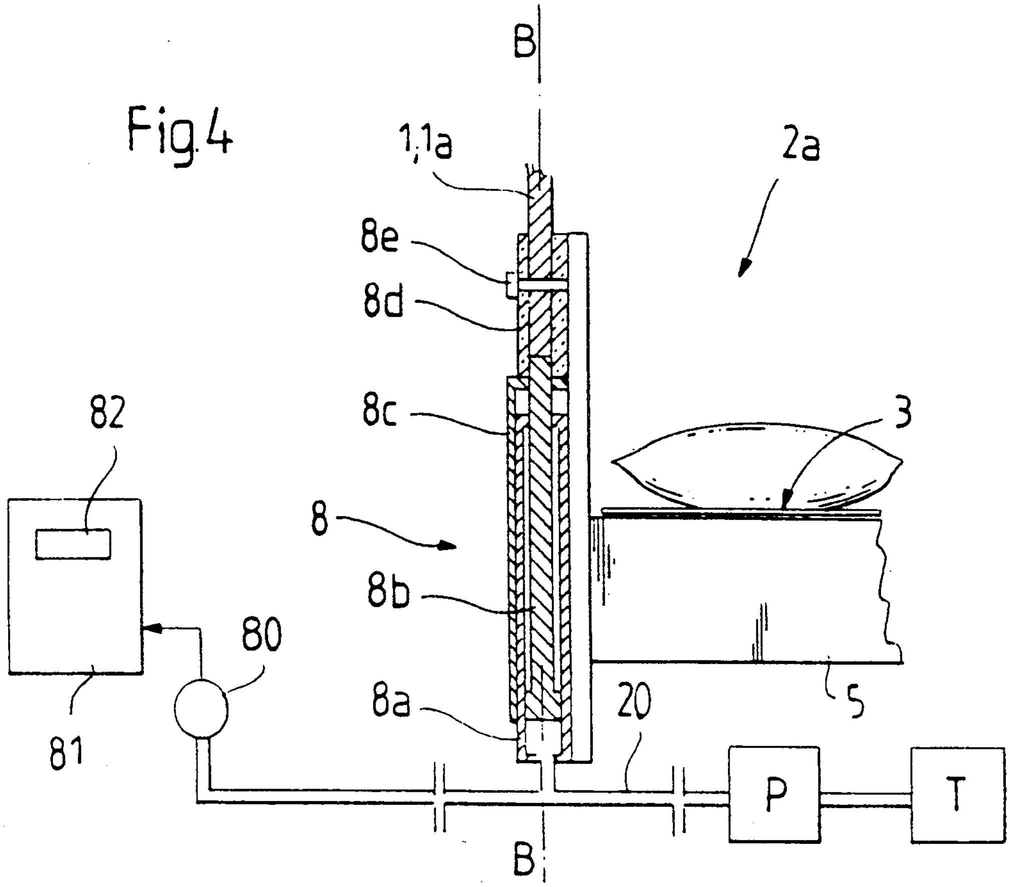
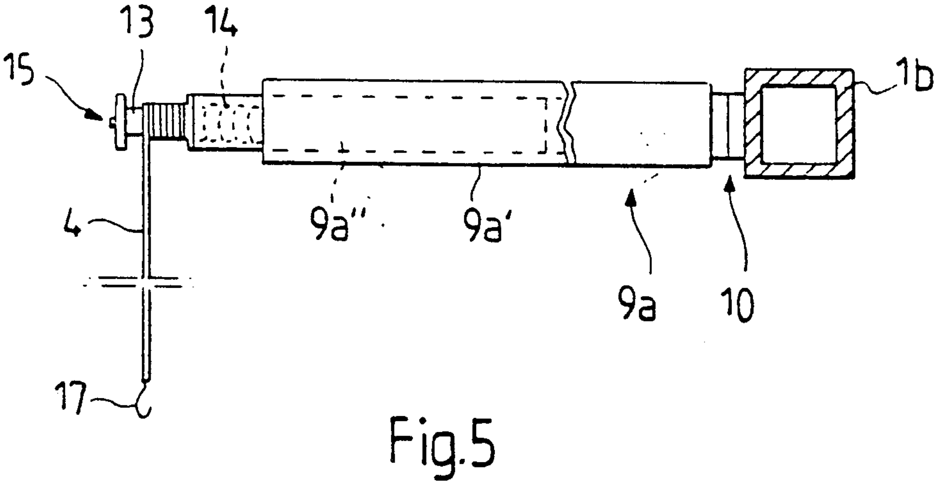
Fig.5

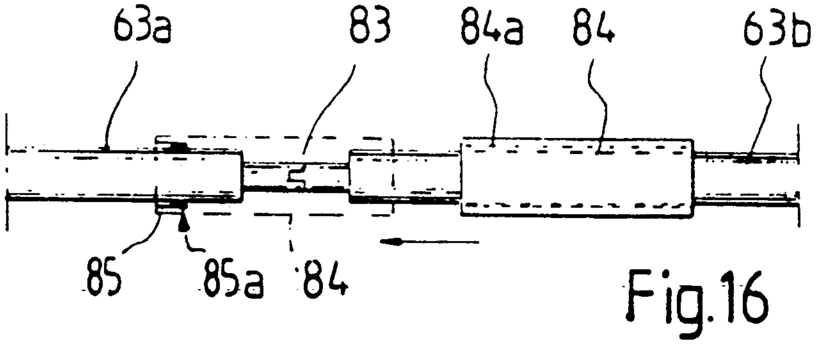
Fig.16
Fig.17
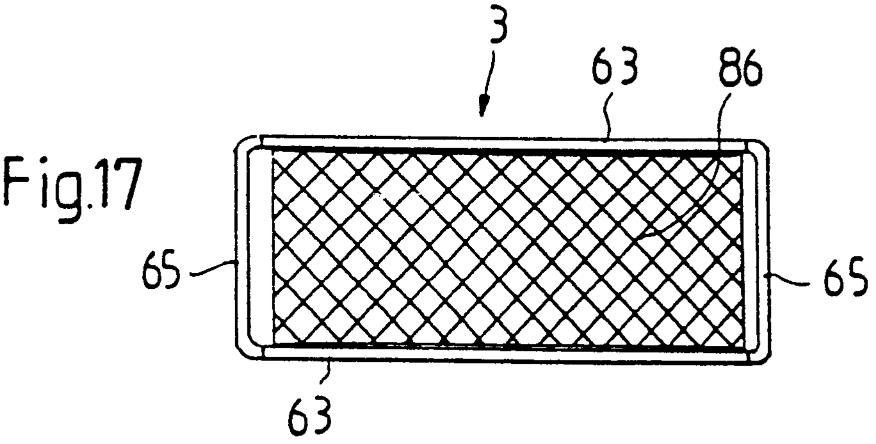
Fig.19
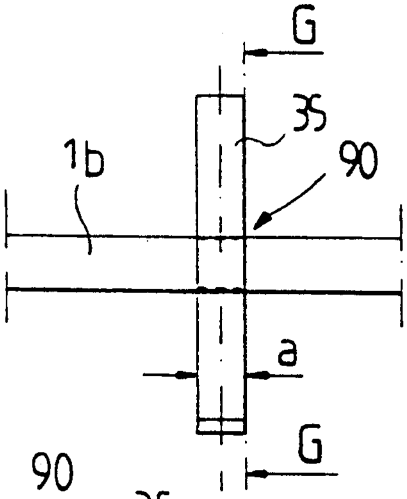
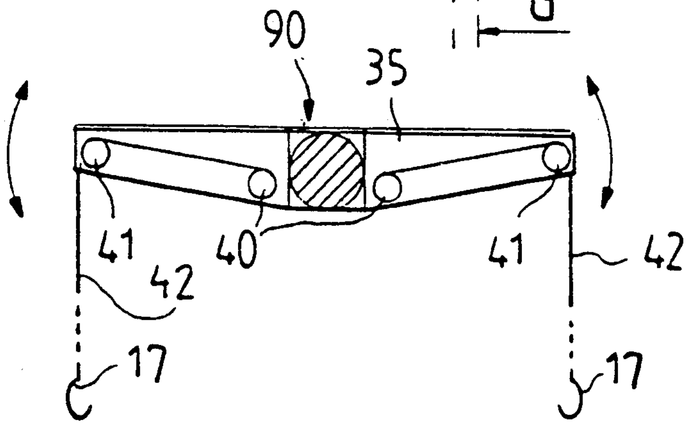
Fig.20

APPARATUS FOR TRANSFERRING PATIENTS

FIELD OF THE INVENTION

The present invention relates to an apparatus for transferring patients, the apparatus comprising an elongate support frame, which is connected to the bed; a couch for the patient; and transfer means for transporting the patient on the couch, supported by the frame.

BACKGROUND OF THE INVENTION

The moving of non-ambulant patients is a serious problem particularly in hospitals, but also elsewhere in the nursing field. In connection with basic care and treatment, it is frequently necessary to lift and move chronic and non-ambulant patients. In many cases, only two nurses take care of the lifting or transport operation. In the worst case, there is only one nurse who does the lifting alone. Then the nurses often have to make allowances with respect to the correct lifting technique. Consequently it is obvious that nurses have remarkably more spinal symptoms and injuries than in many other professions. According to Finnish investigations, the risk among assistant nurses, who lift in average twice as many patients as trained nurses, for becoming disabled because of sciatica is 4.5-fold as compared to trained nurses.

In the prior art there is known, from the Swedish patent publication 406,037, a hauling device for bedpatients, wherein a support frame located above the bed is provided with a pulley as transfer means and a yoke which extends across the bed in the transversal direction. The couch for the patient is attached to the rails provided at the sides of the bed and the patient, which rails in turn are attached to the yoke. By means of the pulley, the yoke and hence the patient lying on the bed can be lifted and moved.

In the prior art there is also known, from the Swedish patent 341,787, a hauling device for patients, wherein a vertical pole serving as the support frame is fastened to the edge of the bed. The support frame also includes a horizontal pole extending to above the bed. The couch is rigid in construction and is placed in the bed under the patient. The transfer means for moving the patient are composed of a hauling device, which is fastened to the end of the horizontal pole. The hauling device comprises an electric motor and a reel whereto the lifting wire is attached. Moreover, the transfer means include an arched frame which is placed transversally above the patient, and the rigid couch is fastened to this arched frame. At its top end, the arched frame is attached to the lifting wire.

One problem with the prior art devices is that the transfer means are placed in connection to the support frame, above the bed and the patient. This increases the load on the support frame, takes up space above the bed and in general makes the operating of the device more difficult.

Another problem with the prior art devices is that the placing of the transfer means, particularly the pulley and the electric motor, is a safety hazard both for the patient and the operating staff.

A further problem in the current devices is that they are instable; the couch and the patient lying on it are attached, by intermediation of the transfer means, to one point of the support frame hanging above the bed. Consequently, when moving a patient, special care must be taken in order to keep the center of gravity in exactly the right spot, so that the patient cannot suddenly roll over to either side on the couch. Such a fastening method is dangerous both for the patient and the operating staff.

Yet another problem with the prior art devices is that various yokes, frames and like members of the transfer means cause difficulties when using the apparatus; the yoke or frame must be separately lifted to above the patient and fastened to the couch and the hauling device proper so that the patient is in balance.

Yet another problem with the prior art devices is that they must be specially installed to the bed whenever they are needed.

SUMMARY OF THE INVENTION

The object of the present invention is to eliminate the above mentioned drawbacks.

The apparatus of the invention is characterized by the novel features enlisted in the patent claim 1.

According to the invention, the transfer means include a hauling device which is fitted in between the support frame and the level bottom of the bed, so that the support frame and the bed bottom are adjustable with respect to each other, essentially in the vertical direction.

In a preferred embodiment of the invention, the support frame is directly connected to the bed frame, in which bed the bed bottom is vertically adjustable in relation to the frame, and the hauling is carried out by the hauling device of the bed bottom.

In another preferred embodiment of the invention, the hauling device is connected to the stationary bed structure formed by the bed bottom and the frame, and the support frame is connected to the hauling device.

In another preferred embodiment of the invention, the hauling device includes at least one hydraulic cylinder. In general, the transfer means, particularly the hauling apparatus, can be composed of manually operated power units, such as revolving hoisting gear, or of electric, pheumatic or hydraulic power units and power transmission devices connected thereto.

In another preferred embodiment of the invention, the support frame is at least partly turnable essentially on the horizontal level with respect to the vertical axis. Apart from lifting, the apparatus of the invention can then be used for shifting the patient sideways at least partly to outside the bed. The turning can be carried out manually, by manipulating the support frame.

In another preferred embodiment of the invention, the transfer means include a swivelling device, by means of which the support frame is at least partly turnable essentially on the horizontal level. This swivelling device can be a mechanical device, a hydraulic cylinder or an electric motor.

In another preferred embodiment of the invention, the apparatus comprises at least one auxiliary support, whereby the bed and the apparatus are supported during the turning step. The auxiliary support may be fastened to the bed or to the support frame or to both. The purpose of the auxiliary support is to prevent the apparatus and the bed from falling over when the support frame is turned away from above the bed, with respect to the longitudinal direction of the bed.

In another preferred embodiment of the invention, the apparatus comprises an auxiliary support which is connected to the support frame so that the auxiliary support is turned along with the support frame, while the support frame is turned with respect to the vertical axis. By means of this arrangement, the auxiliary support does not have to be separately turned prior to the turning of the support frame while shifting the patient. This automatically ensures that the bed and the apparatus for transferring the patient and connected thereto cannot fall over, not even by accident.

In another preferred embodiment of the invention, the auxiliary support is provided, at least at its free end, with one or several wheels, rollers or other such members. The purpose of these members is, apart from supporting the free end of the auxiliary support, also to make the turning or the support frame and the auxiliary support easier by reducing the friction between the free end of the auxiliary support and the surface underneath it.

In another preferred embodiment of the invention, the auxiliary support is attached to the support frame, turnably in the vertical direction, and in connection to the auxiliary support there are arranged means for fastening the auxiliary support rigidly in place at least when the support frame is turned at an angle with respect to the longitudinal axis of the bed. This kind of flexible fastening of the auxiliary support ensures that tresholds and other bulges in the floor or other passageway are safely passed when the bed and the apparatus for transferring patients, attached thereto, are transported for instance from one hospital ward to another. On the other hand, the auxiliary support is in the vertical direction secured rigidly in place, i.e. it is advantageously pressed against the floor, when the apparatus for transferring patients is being used and particularly when the support frame is turned sideways from its regular position, i.e. from above the bed. The securing means are most advantageously formed of mechanical support devices or guides which prevent the support frame, supported by its articulated shaft, from turning vertically more than a few degrees.

In another preferred embodiment of the invention, the securing means comprise an elongate member which is fitted in between the auxiliary support and the bed frame, so that by intermediation of this said member the auxiliary support and the bed frame in collaboration support the support frame, particularly when shifting the patient on the horizontal level.

In another preferred embodiment of the invention, the support frame is detachably fastened to the bed. This means that any hospital bed or the like can be provided with the apparatus of the invention for transferring patients. The said apparatus can also be detached from the bed, should this be necessary for maintenance or repairs.

In another preferred embodiment of the invention, the couch is fastened to the support frame with straps or other similar suspending members while using the apparatus, so that the support points of the straps in the support frame are located at given intervals from each other, and that at least one of the support points is located outside the straight line passing through the two or more support points. This kind of fastening by three or more points ensures that the supporting couch cannot accidentally swing during the transportation. Thus the transport operation becomes stable and is easily carried out by one nurse alone.

In another preferred embodiment of the invention, in connection to the elongate support frame, there is arranged at least one crossbar, the arms whereof are located at an angle with respect to the support frame, and which arms can be fastened to the couch by means of straps or other such suspending means while transferring the patient.

In another preferred embodiment of the invention, the crossbar is attached to the support frame by means of fastening members so that the crossbar is movable along the support frame and can be locked in a desired position. Thus the crossbar can be adjusted to be at the most advantageous point, with respect to the patient in question, in order to carry out the transport operation.

In another preferred embodiment of the invention, the arms of the crossbar are provided with articulations. Thus the arms can be folded to be essentially parallel to the support frame, or possibly upwards when the apparatus is not in use.

In another preferred embodiment of the invention, each arm is composed of a number of telescopically nest parts. These arms can be fitted in a small space when the apparatus is not in use. On the other hand, their length can be adjusted to be suitable, for example according to the width of the bed, when the apparatus is being used.

In another preferred embodiment of the invention, at least one auxiliary support is located in connection to the free end of the support frame, so that the support frame can be extended thereby. It is fitted to be for instance a straight member inside the support frame and can be drawn out to form an extension. Thus the support frame can be lengthened when necessary.

In another preferred embodiment of the invention, the straps or other such suspending members are arranged on reels. These reels are connected to the support frame and/or the crossbar, and they can be provided with for instance mechanical or electronic coiling devices in order to make the coiling of the straps easier. In the rest position, the straps are coiled on the reels, wherefrom they can be pulled down and fastened to the couch.

In another preferred embodiment of the invention, the reels are loaded with springs, so that in the rest position the suspending means such as straps are coiled on reels, wherefrom the straps can be pulled out and fastened to the couch. As the spring-loaded reels, any type of known devices, such as the strap-and-reel device known from car safety belts, can be employed.

In another preferred embodiment of the invention, the couch includes an underlay which is made of some flexible material and which in all essential dimensions corresponds to those of the bed and especially to those of the matress; as well as support rails, which are fitted along the long sides of the underlay. The support rails are fastened to the underlay, advantageously in a detachable fashion. While using the apparatus of the invention, the straps are easily fastened to the support rails located at the sides of the underlay.

In another preferred embodiment of the invention, each support rail is provided with an articulation and a locking sleeve, whereby the support rail can be locked to form a uniform, rigid pole.

In another preferred embodiment of the invention, the couch is on all sides provided with support rails which can be detachably connected and form a framework around the underlay. Now the couch in practice forms a basin-like unit, whereupon the patient is transported easily and safely.

In another preferred embodiment of the invention, the underlay is made of net.

In another preferred embodiment of the invention, the underlay is made of some waterproof material.

In another preferred embodiment of the invention, the underlay is provided with an opening which is most advantageously placed in the middle of the underlay. This type of couch can be used when washing the patient.

In another preferred embodiment of the invention, the opening in the underlay can be provided with an outlet hose. The outlet hose is further connected to a sewer or a vessel whereto the liquid can be collected. Thus the washing of the patient can be conveniently arranged.

In another preferred embodiment of the invention, the support frame is provided with means for measuring the weight of the patient.

In another preferred embodiment of the invention, the support frame is provided with means for measuring the weight of the patient, the said means comprising a pressure sensor arranged in connection to a hydraulic cylinder, the said pressure sensor being subjected to the pressure of the cylinder space, and a processing unit for translating the measuring signal from the pressure sensor into a weight unit, and a device for indicating the measured weight.

In another preferred embodiment of the invention, the support frame is provided with a swing device comprising a crossbar and straps or other such suspending means, the said crossbar being attached essentially vertically and turnably to the support frame so that the crossbar can be swinged, resting on the support frame, and that the straps or other such suspending members can be fastened to the underlay arranged under the patient. By means of this swing device, the patient can be moved in the transversal direction. Accordingly, the patient is shifted from side to side, which motion is important for the circulation of permanently non-ambulant patients. Obviously this kind of a device can also be attached to a simple crossbeam arranged above the bed, and the apparatus of the invention for transferring patients is not necessarily needed at all.

In another preferred embodiment of the invention, the swing device comprises an actuator, such as a hydraulic cylinder or an electric motor, for moving the crossbar and further the patient. Such an actuator can be momentarily switched on by a switch arranged at the head of the bed under the control of a nurse. As an alternative, the swing device can also be operated manually.

In another preferred embodiment of the invention, the underlay is arranged under the mattress in the bed. With this arrangement, the patient rests comfortably on the mattress during the treatment, and at the same time the mattress supports the patient.

In another preferred embodiment of the invention, the underlay is formed of the couch. Thus the members of the apparatus according to the present invention can be used for several different purposes.

In yet another preferred embodiment of the invention the support frame comprises essentially vertical frame parts arranged at both ends of the bed, and a connecting, essentially horizontal frame part.

In another preferred embodiment of the invention, the vertical frame parts are directly connected to the bed frame, in which bed the bed bottom is vertically adjustable in relation to the frame, and the hauling is carried out by the hauling device of the bed bottom.

In another preferred embodiment of the invention, the hauling device is connected to the stationary bed structure formed by the bed bottom and the frame, and the vertical frame parts are connected to the hauling device.

In yet another preferred embodiment of the invention, the horizontal frame part is detachably fastened to one of the vertical frame parts, and the horizontal frame part is turnable essentially on the horizontal level. Apart from lifting, the patient can, when employing this apparatus of the invention, be moved sideways, either manually or by means of the swivelling device, at least partly to outside the bed. The horizontal frame part and the first vertical frame part can be provided with all auxiliary devices that in this specification were suggested to be used in connection to the support frame, such as the auxiliary support, the crossbar, the straps or other such suspending means, various couches and the swing device.

An advantage of the present invention is its simple structure. The apparatus is suited for currently used hospital beds with relatively small modifications.

Another advantage of the present invention is that, owing to its simple structure, all hospital beds can be provided with the transfer devices of the present invention.

Another advantage of the present invention is that the apparatus has a stabile structure. The position of the patient during the transportation remains stable.

Yet another advantage of the present invention is that it is easy to use.

Moreover, another advantage of the present invention is that by employing the apparatus of the invention, one person can alone carry out the lifting or, more generally, moving of a patient in a safe fashion.

Yet another advantage of the present invention is that from the point of view of the patient, the moving operation is safe and pleasant.

A further advantage of the present invention is that the apparatus can be turned to an angle with respect to the lengthwise direction of the bed, and still there is no danger of the bed falling over.

Another advantage of the present invention is that it makes the work of the hospital staff remarkably easier and increases their safety at work.

Moreover, the invention helps to move and transport patients irrespective of the circumstances, for instance in cramped spaces.

Furthermore, the invention enables the moving and particularly lifting of a patient in many situations, where the use of a mechanical aid has earlier not been possible, or where it has been difficult, for example in connection with basic care (i.e. making of the bed, installing the bedpan, bathing the patient etc.).

Another advantage of the present invention is that various different couches designed for various different purposes and uses can be employed in connection to the apparatus of the present invention.

A further advantage of the present invention is that the structures of the apparatus, and particularly the support frame thereof, can also be used in other nursing or connected activities, for instance for hanging up various implements such as facilities for physiotherapy. This is possible because the support frame extending to above the bed does not necessarily include any obstacles, such as bulky auxiliary devices or devices to be protected.

An advantage of the present invention also is that the means for measuring the weight of the patient can be easily connected to the apparatus. Keeping an eye on the patient's weight is important, especially in certain patient groups, such as nonambulant old people.

BRIEF DESCRIPTION OF THE DRAWINGS

In the following the invention and its further advantages will be explained in detail with reference to the appended drawings, where

FIG. 4 is an illustration of the hydraulic cylinder attached to the head of the bed;

FIG. 5 is an illustration of the arm of the crossbar attached to the support frame and of the connected members;

FIG. 16 illustrates a detail of the support rail of the couch;

FIG. 17 illustrates a couch;

FIG. 19 illustrates a detail of a horizontal crossbar;

FIG. 20 is an illustration of the crossbar of FIG. 19, seen along the section G—G, and of the crossbar connected thereto;

DESCRIPTION OF THE PREFERRED EMBODIMENTS

The apparatus of the invention for transferring patients is connected to a bed 2, particularly a hospital bed. The apparatus comprises an elongate support frame 1, which is at one end connected to the bed 2, the second free end whereof in this case extends to above the bed; a couch 3 for the patient and transfer means for moving the patient on the couch 3 supported by the support frame 1.

Figure 1:
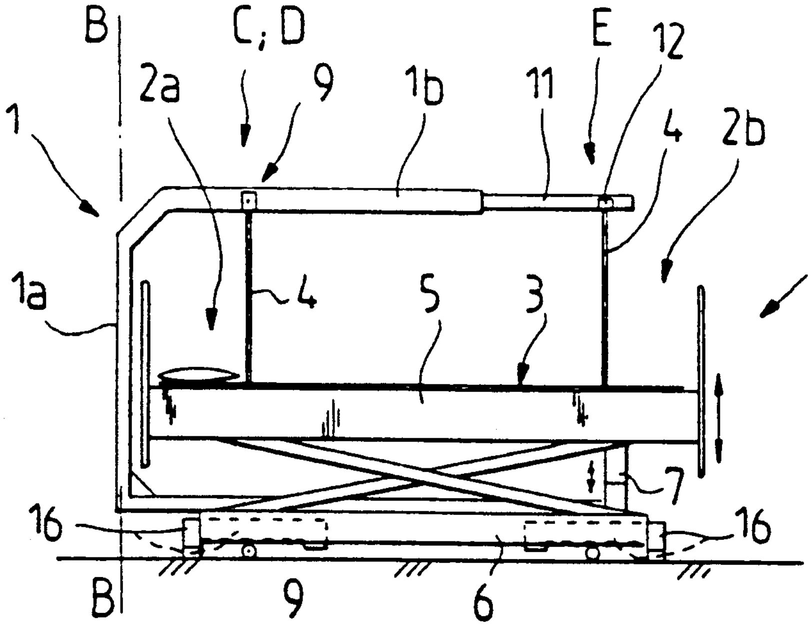
FIG. 1 is a side-view illustration of a bed provided with an apparatus of the invention for transferring patients.
Figure 2:
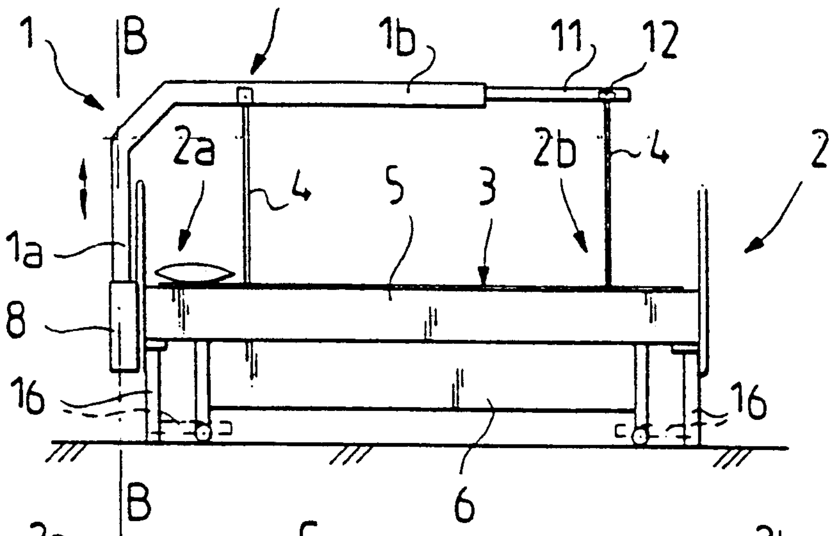
FIG. 2 is a side-view illustration of another bed provided with another apparatus of the invention for transferring patients.

The apparatus of the invention is in principle suited to be used in connection with two different types of hospital beds. FIG. 1 illustrates a bed where the level bottom 5 is vertically adjustable with respect to the bed frame 6. In between the bed bottom 5 and the frame 6 there is provided a hauling device or lifting device 7. FIG. 2 illustrates a hospital bed where the bed bottom 5 and the frame 6 form a stationary bed structure.

According to the invention the transfer means, particularly the hauling device, are fitted in between the support frame 1 and the bottom 5 of the bed 2, so that the support frame 1 and the bed bottom 5 are essentially vertically adjustable with respect to each other.

In the hospital bed of FIG. 1, the support frame 1 is directly joined to the bed frame 6. As the transfer means, and particularly as the hauling device, serves the hauling device 7 of the bed bottom 5.

In the hospital bed of FIG. 2, the transfer means, particularly the hauling device, are joined to the stationary bed structure formed by the bed bottom 5 and the bed frame 6, and the support frame 1 is connected to the transfer means, particularly to the hauling device, which in this case is formed of the hydraulic cylinder 8.

FIG. 4 illustrates one possibility for attaching the hydraulic cylinder 8 to the bed. In this case it is fastened to the bed head 2*a*, to the stationary bed structure. Inside the cylinder barrel 8*a*, there is located the piston 8*b*, which is connected to the bottom end of the support frame 1. In connection with the piston 8*b*, there is provided the barrel 8*c*, which at least partly surrounds the cylinder 8*a* and serves as a protective cover for the cylinder when it is being used. The piston 8*b* is connected, by means of the collar 8*d*, to the support frame 1, and they are locked to each other by means of a pin 8*e* or other such locking member.

The hydraulic cylinder 8 is connected to the pump P, and this possibly further to the fluid tank T. The pump P can be manually operated or provided with a suitable power unit such as an electric motor.

The support frame 1 is at least partially turnable on the horizontal level with respect to the vertical axis B—B. In the embodiment of FIG. 4, this is carried out so that the pin 8*e* is released, whereafter the support frame 1 can be turned so that it rests against the collar 8*d*.

The couch 3 is fastened, by means of straps 4 or other similar suspending members, to the support frame 1 above the bed 2 when the apparatus is being used. The support points C, D and E in the support frame 1 are located at intervals from each other, and at least one, for example C, of the support points is located outside the straight line passing via the other two points D, E. Thus the couch 3 is supported against the support frame 1 at three different points C, D and E, which are located at the apices of a triangle, preferably an equilateral triangle, in which case the patient lying on the couch 3 can be lifted in a stable fashion from the bed or can be left in a stable position supported by the support frame 1, while the bed bottom 5 is being lowered.

The elongate support frame 1 is, in the embodiments illustrated in the drawings, formed of an essentially vertical frame 1*a* and of an at least roughly horizontal frame 1*b*. These can be joined together either in a curved or angular fashion.

The vertical, i.e. the first frame part 1*a* is arranged at one end 2*a* of the bed, preferably at the head of the bed.

The section of the elongate support frame 1 which extends to above the bed, in this case the second frame part 1*b*, is provided with a crossbar 9. The arms 9*a*, 9*b* of the crossbar are located at an angle, advantageously an angle of 90°, with respect to the second part 1*b*. The free ends of the arms 9*a*, 9*b* are, by means of straps 4, connectable to the couch 3 while the patient is being moved.

The arms 9*a*, 9*b* can be joined to the second frame part 1*b* either permanently or detachably. Each arm 9*a*, 9*b* can also be connected, by means of an articulation 10, such as a vertical hinge, to the second part 1*b* either directly or by intermediation of a rider, such as a collar, movable along the support frame 1. In this case the arms 9*a*, 9*b* can be folded to be essentially parallel to the second frame part 1*b*, when the apparatus is not in use.

Figure 3:
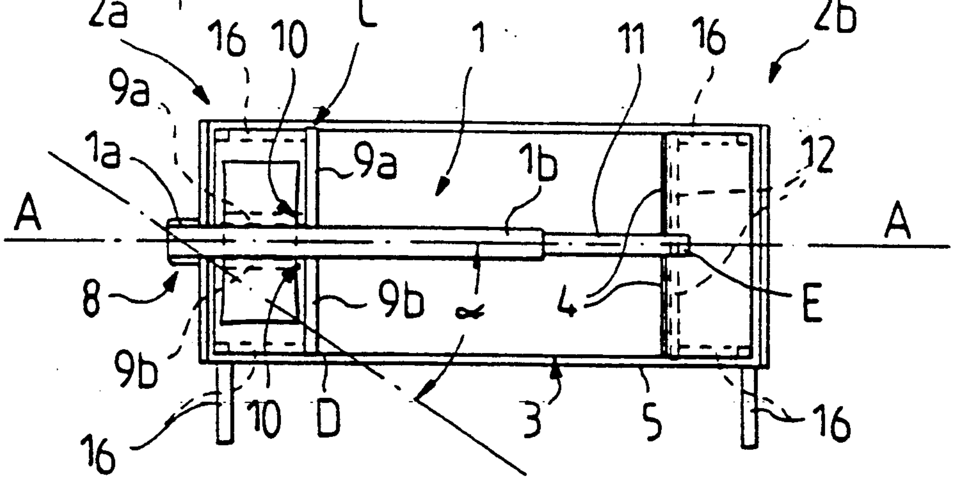
FIG. 3 is a top-view illustration of the bed of FIG. 2 and of the apparatus for transferring patients.

Each of the arms 9*a*, 9*b* can have a permanent length, so that it extends to a given distance from the second part 1*b* of the support frame, as is illustrated for instance in FIG. 3.

Alternatively the arms 9*a*, 9*b* of the crossbar can be made of a number of telescopic parts, which can be pressed to nest inside each other or folded parallel to each other, and drawn out to form an extended arm when the apparatus is in use. FIG. 5 is a schematical illustration of an arm 9*a* formed of two arm members 9*a*' and 9*a*".

The second frame part 1*b* of the support frame 1 is in FIGS. 1-3 provided with an auxiliary member 11. This is at least partly fitted inside the second frame part 1*b*, and can be drawn out to form an extension for the second frame part 1*b* when the apparatus is being used.

In the embodiment of FIG. 3, the straps 4 are at the head end 2*a*, nearest to the head of the patient, fastened to the free ends of the crossbar 9, and at the foot end 2*b* of the bed to the auxiliary member 11 of the frame 1. The second ends of the straps 4 are fastened to the couch 3 on both sides of the patient, both at the head and foot ends of the bed.

To the auxiliary member 11 or to the end of the second frame part 1*b* of the support frame 1, there can also be attached another crossbar 12, in structure corresponding to the crossbar 9. Thus the foot of the bed can be lifted in exactly the same fashion as the upper part of the patient. It is, however, pointed out that in most cases the fastening of the straps directly to the auxiliary member 11 or to the second frame part 1*b* is perfectly sufficient, and the patient can in this way be lifted in a safe and stabile fashion from the bed bottom 5.

The straps 4 or other similar suspending members can be formed of a given length of some material which is flexible and pneumatic but maintains its length, and these members are fastened in between the support frame 1 and the couch 3 while performing the transport operation. They are supported against the crossbar 9 of the second frame part 1*b* of the support frame 1 at the points C and D, and against the frame part 1*b*, in the vicinity of its free end, at the point E.

The straps 4 or other similar suspending members can also be arranged on reels 13 as is shown in FIG. 5. These reels 13 are arranged in connection with the support frame 1; in this case at the free ends of the arms 9*a*, 9*b* of the crossbar 9. Most advantageously the reels 13 are loaded with springs, so that in the rest position the straps are coiled on the reels 13. From the reels 13, the straps can be pulled down off the support frame 1 and attached to the couch 3 by means of hooks 17 or other such fastening members.

The straps 4 arranged on the reels 13 have a permanent length, or alternatively the reels 13 can be provided with locking members 15 in order to prevent the coiling and extension of the strap when a patient is being lifted. The locking member 15 can be for instance a pin parallel to the axis of the reel 13, which pin locks the reel to the arm 9*a* or to its part 9*a*" so that it cannot rotate.

In connection to the bed 2, advantageously to the ends 2*a*, 2*b* (FIG. 2), or to the frame 6 (FIG. 1) there are arranged turnable auxiliary supports 16, which are supported against the floor in the lengthwise direction of the bed. By means of these auxiliary supports it is ensured that the bed does not fall over when the patient is being moved from the bed 2 to the couch or the like which is brought next to the bed.

At the ends 2*a*, 2*b* of the bed there can be arranged fastening means, such as hooks, in order to temporarily couple another bed or couch next to the bed while the patient is being moved.

Figure 6:
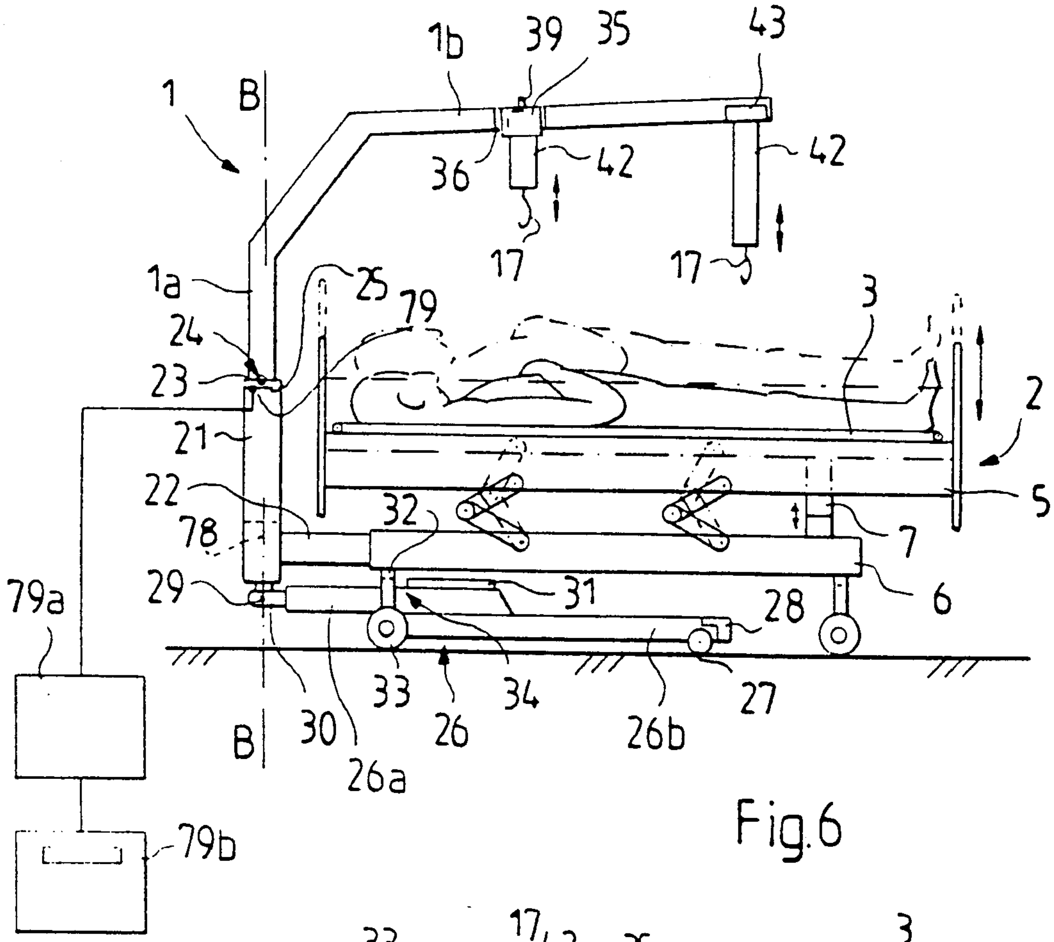
FIG. 6 is a side-view illustration of a bed provided with a third apparatus of the invention.
Figure 7:
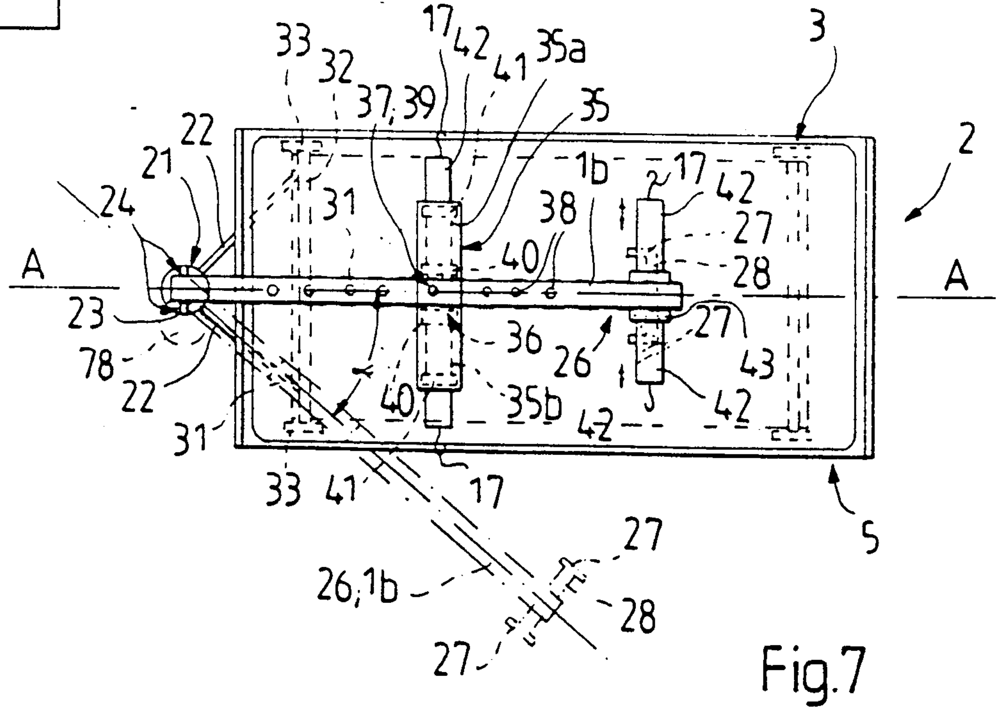
FIG. 7 is a top-view illustration of the apparatus of FIG. 6.

FIGS. 6 and 7 illustrate a third preferred embodiment of the invention, this apparatus being arranged in connection to a bed with an adjustable height. In its regular position, the elongate support frame 1 extends from the head of the bed towards the foot of the bed along the center line A—A. The free end of the support frame, i.e. the second part 1*b* of the support frame, is roughly horizontal and is connected in an angular (or curved) fashion to the first part 1*a*. The first part 1*a* of the support frame is in the vertical direction fitted inside a tubular member 21 which is fastened to the bed frame 6 by means of supports 22.

The first part 1*a* of the support frame 1 is attached to the tubular member 21 by means of an annular support, such as a sliding bearing 23. The sliding bearing 23 rests on top of the top part of the tubular member 21, either freely or as fastened thereto in a suitable fashion. At a suitable height in the bottom part of the first part 1*a* of the support frame 1, there is arranged a bracket, such as a pin 24 or an annular flange. This bracket 24 is suitably fastened to the first part 1*a* of the support frame, and against it the elongate support frame 1 rests on top of the sliding bearing 23, and further the tubular member 21 rests, by intermediation of the supports 22, against the bed frame 6.

In the first part 1*a* of the support frame 1 and in the tubular member 21 there are advantageously arranged focusing means whereby the first part 1*a* of the support frame can easily be adjusted to be parallel to the lengthwise axis A—A of the bed, and also easily and detachably locked in this position. The focusing means are advantageously realized by means of an annular support 23 and brackets 24. The annular support 23 is suitably provided with at least one recess 25 whereto the brackets 24, such as pins are partially pressed when the first part 1*a* of the support frame 1 is parallel to the lengthwise axis A—A of the bed.

The patient transfer device includes an auxiliary support 26, which is connected to the support frame 1, in this case to the first part 1*a* of the support frame, so that the auxiliary support 26 turns along with the support frame 1 while it is turned on the horizontal level with respect to the vertical axis B—B. The auxiliary support 26 is an elongate member which in the direction of the second part of the support frame extends from the turning axis B—B to a distance which is advantageously at least half of the bed length.

The auxiliary support 26 is at its free end provided with one or several wheels 27, rollers or other such member which can freely rotate around the vertical fastening axis, as well as around their horizontal center axis. In the apparatus of FIGS. 6 and 7, at the free end of the auxiliary support 26 there is arranged a crossbar 28, which is provided with small wheels 27 at given intervals from each other.

The auxiliary support 26 is turnably attached to the bottom end of the first part 1*a* of the support frame 1, which extends through the tubular member 21 to below it. This type of fastening arrangement can be realized by means of a pin 29 and a fork 30. Such a flexible fastening method makes it easier to move the combination of bed and patient transfer device for instance from one room to another or from rooms to elevators, in case there are thresholds or the like obstacles in between these facilities. Accordingly, while the hauling apparatus is in its regular position, i.e. while the second part 1*b* of the support frame 1 is parallel to the bed axis A—A, the free end of the auxiliary support 26, provided with wheels 27, is free to move in the vertical direction, suitably at least as much as the said threshold or other bulge, and does not cause problems to the moving of the combination of bed and hauling apparatus.

In connection to the auxiliary support, there are arranged special aids for securing the auxiliary support rigidly in place in the vertical direction. These aids are used when the support frame 1, particularly its second part 1*b*, is turned at an angle $\alpha$ with respect to the lengthwise axis A—A of the bed 2. Thus, by means of these securing aids, any vertical movement of the free end of the auxiliary support is eliminated when the apparatus is being used and the support frame 1 is turned away from the lengthwise axis A—A of the bed. Accordingly, the employed aids can be various mechanical locking means, whereby the auxiliary support is prevented from turning with respect to the support frame 1.

In the embodiment of FIGS. 6 and 7, these locking means are formed of an elongate member 31, which is fitted in between the auxiliary support 26 and the frame 6 of the bed 2. The member 31 is installed on top of the auxiliary support 26, at a distance from the vertical axis B—B, which distance is longer than the distance of the back piece provided in the bed frame 6, such as the transversal beam 32, from the corresponding vertical axis. In this case the transversal beam 32 is connected to the supporting structures of the wheels 33 of the bed 2. Thus there is provided a small slot 34 in between the beam 32 and the member 31 when the support frame 1 and the connected auxiliary support 26 are parallel to the lengthwise axis A—A of the bed. When the support frame 1 is turned to an angle $\alpha$ with respect to the lengthwise axis A—A of the bed, the member 31 is shifted, due to the turning step, to below the transversal beam 32 and is supported against it. Thus, by intermediation of the member 31, the auxiliary support 26 and the bed frame 6 in collaboration support the support frame 21 while the patient is being moved. Advantageously the top part of the member 31 is a sliding surface, i.e. a surface with a low friction coefficient.

In the embodiment of FIGS. 6 and 7, the auxiliary support 26 is formed of two parts 26*a* and 26*b*. These parts are suitably attached on top of each other, so that the top part 26*a* is fastened to the support frame 1. By means of this arrangement, the top surface of the auxiliary support 26 is ascended near the bed frame 6, so that the member 31 can be formed as a relatively low structure. At the same time, a relatively large ground clearance is obtained for the transfer device near the turning axis B—B.

The support frame 1 and the auxiliary support 26 attached thereto are supported against the bed frame 6 by means of the supports 22 of the tubular member 21. In this case the supports 22 form a V-shaped supporting member, which is permanently attached to the bed frame 6. Alternatively the supports 22 can be fastened detachably for instance by means of bolts to the bed frame 6, where there are suitably arranged threaded lugs or other holes for the fastening bolts or screws.

In connection to the support frame 21 and the auxiliary support 26, for instance adjacent to the tubular member 21, there can be installed a swivelling device 78, such as an electric motor which is, by power transmission means, connected to the bottom part of the first part 1*a* of the support frame 1. Thereby the turning can be carried out from a control panel located for example at the head of the bed 2.

In connection to the second part 1*b* of the support frame 1, there is arranged a crossbar 35. The crossbar 35 is attached to the support frame 1 by means of fastening members so that it can be moved along the second part 1*b* of the support frame and locked at the desired spot. In this case the fastening members include an aperture 36 or other similar element in the crossbar, wherethrough the second part 1*b* of the support frame is arranged to pass, a hole 37 in the crossbar and a number of openings, such as holes 38, which are placed at certain intervals from each other in connection to the second part 1*b* of the support frame 1, and a pin 39, whereby the crossbar 35 is locked in place, by the aid of the aperture 36 and the holes 37, 38, at a suitable position with respect to the transport of the patient.

The crossbar 35 is provided with reels 40, which are installed in connection to the crossbar in the vicinity of the fastening point of the support frame 1, parallel to the support frame and also to the bed axis A—A. At the ends of the arms 35*a*, 35*b* of the crossbar 35, there are provided folding reels 41, wherethrough the straps 42 are arranged to pass.

In the vicinity of the free end of the second part 1*b* of the support frame 1, there is provided a second set of reels 43 on both sides of the support frame, so that their axes are parallel to the lengthwise axis A—A of the bed. The second set of reels 43 is provided with straps 42 in similar fashion as the first set 40. Also in this case the reels 40, 43 are loaded with springs (not illustrated in the drawings), so that the straps 42 are in the rest position while being coiled on the reels 40, 43. From these reels, the straps are pulled down and fastened to the couch 3 by means of the hooks 17 arranged at the ends of the straps.

In length the straps 42 are such that they extend, while pulled out, as far as the edges of the couch 3 when the bottom 5 of the bed 2 is lifted to its top position. This is carried out by means of the hauling device 7 of the bottom 5 of the bed itself. When the couch 3, complete with the patient, is fastened to the support frame 1 by means of the straps 42, the bed bottom 5 is lowered by means of operating the hauling device 7 in the opposite direction, so that the couch 3 with its load remains suspended from the support frame 1. Thereafter the second part of the support frame can be gripped and it can be turned from its regular position, parallel to the lengthwise axis A—A of the bed, to a desired angle $\alpha$ to the side of the bed.

The turning is carried out safely because along with the support frame 1, there is also turned the auxiliary support 26 which prevents the transfer device and the bed 2 from falling when the angle $\alpha$ is relatively large.

Now for instance the couch can be brought beside the bed and adjusted to a suitable height, so that the patient can be directly shifted thereon. The shifting is carried out by detaching the hooks from the couch 3 and by leaving the couch under the patient.

When the patient is brought back to beside the bed, the support frame 1 is again turned to the angle $\alpha$ with respect to the turning axis B—B, and the straps 42 are pulled down from the reels 40, 43 to beside the couch 3, whereto the hooks 17 are attached. Thereafter the support frame 1 can again be turned around the axis B—B so that the second part 1*b* of the support frame 1 is again parallel to the lengthwise axis A—A of the bed. The patient is shifted to rest supported by the bed by lifting the bed bottom 5 from its bottom position by means of the hauling device 7 to its top position, so that the couch and the patient again rest supported by the bed 2. Now the hooks 17 can be detached and the straps 42 coiled on the reels 40, 43. The bed with its patient can now again be lowered to the normal height.

In order to turn the support frame 1 to a sufficiently large angle $\alpha$ with respect to the lengthwise axis A—A of the bed, the wheels 33 of the bed must be placed relatively near to the end where the hauling device 7 is installed. The auxiliary support 26 is arranged in between the wheels 33, in which case they naturally limit the size of the turning angle $\alpha$. With suitable arrangements, the size of the turning angle $\alpha$ is obtained to be at least 45°, advantageously 60° or even larger. These turning angles are sufficiently wide in the regular use of the transfer apparatus of the present invention.

Figure 8:
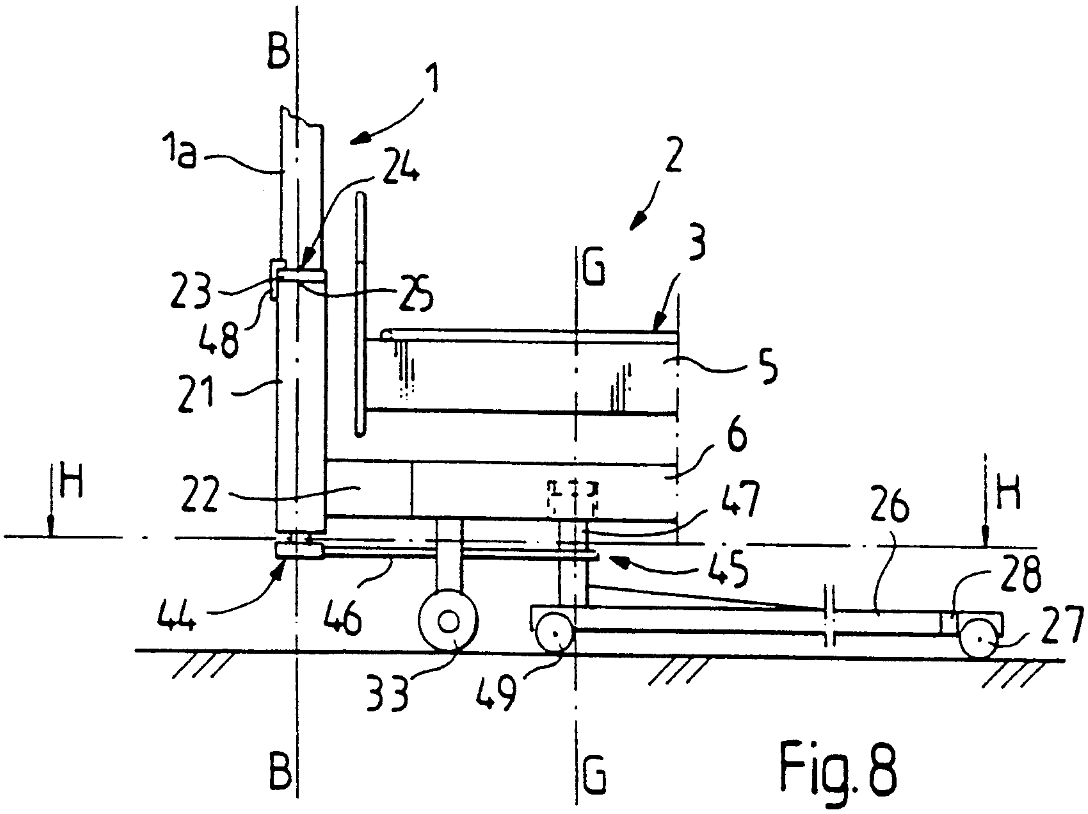
FIG. 8 is a side-view illustration of a structure for connecting the auxiliary support to the support frame.
Figure 9:
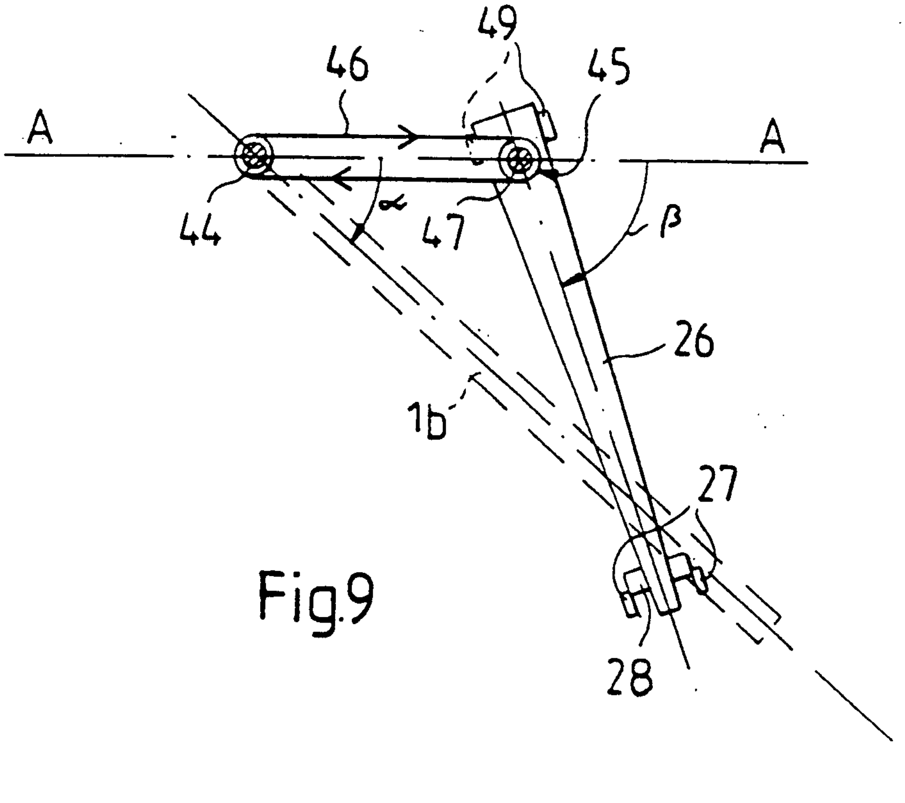
FIG. 9 is a top-view illustration of the structure of FIG. 8, seen along the section H—H.

FIGS. 8 and 9 illustrate another structure for connecting the auxiliary support 26 to the support frame 1. The bed 2 and its frame 6 are in this embodiment interconnected in the same fashion as in FIGS. 6 and 7. The support frame 1 is also connected to the bed frame 6 in similar fashion as in the said drawings. The auxiliary support 26 is joined with bearings to the bed frame 6, at a distance from the turning axis B—B of the support frame 1. The first part 1*a* of the support frame 1 is attached by means of a transmission device to the auxiliary support 26, by means of which transmission device the turning of the support frame 1 is transmitted to the auxiliary support 26 so that it also turns to the same direction.

In the embodiment of FIGS. 8 and 9, the transmission is realized by means of the first and second folding wheels 44, 45, and by means of an endless band 46 or similar member joining them together. The first folding wheel 44 is fastened below the tubular member 21, at the end of the first part of the support frame 1. The second folding wheel 45 is fastened to the vertical axis 47 or the auxiliary support 26. The vertical axis 47 is attached with bearings to the bed frame 6 so that the auxiliary support 26 is free to turn around the axis along a given line. The vertical axis 47 is attached in connection to the bed frame 6 so that it is located further from the vertical axis B—B than the wheels 33 fastened to the bed frame. Now the auxiliary support 26 is unobstructed to turn at least 90° with respect to the lengthwise axis A—A of the bed.

The transmission ratio of the folding wheels 44 and 45 can be chosen to be suitable. For example, the transmission ratio can be 1:1, in which case the turning angle $\alpha$ of the support frame also corresponds to the turning angle $\beta$ of the auxiliary support 26. On the other hand, the transmission ratio can be chosen to be such that the ratio $\alpha:\beta$ of the turning angles is 1:1.5. In that case the auxiliary support 26 is turned 90° when the support frame 1 is turned 600°.

In connection to the first part 1*a* of the support frame 1 and the tubular member 21, there can be adjusted mechanical guides, whereby the turning angle $\alpha$ is limited to be suitable. In the embodiment of FIGS. 8 and 9, these mechanical guides are formed of lugs 48, which are placed symmetrically in connection to the tubular member 21. While turning the support frame 1, the brackets 24 of the support frame are pressed against the guide lugs 48 when the turning angle $\alpha$ has reached its maximum.

In the embodiment of FIGS. 8 and 9, the auxiliary support 26 is provided, in addition to the rollers 27 located at its free end, with another set of rollers 49 arranged in the vicinity of the vertical axis 47. In addition to this, the auxiliary support 26 can be attached to the bed frame 6 by means of the vertical axis 47 so that the fastening is somewhat flexible in the vertical direction. In that case the moving of the bed and the attached transfer apparatus over thresholds is carried out without trouble; near thresholds and other bulges in the floor, the auxiliary support 26 is free to shift somewhat in the vertical direction. On the other hand, the auxiliary support functions in connection with the support frame as it should: it prevents the bed from falling over when the patient is being lifted, by means of the apparatus of the invention, from the bed and shifted sideways.

Figure 10:
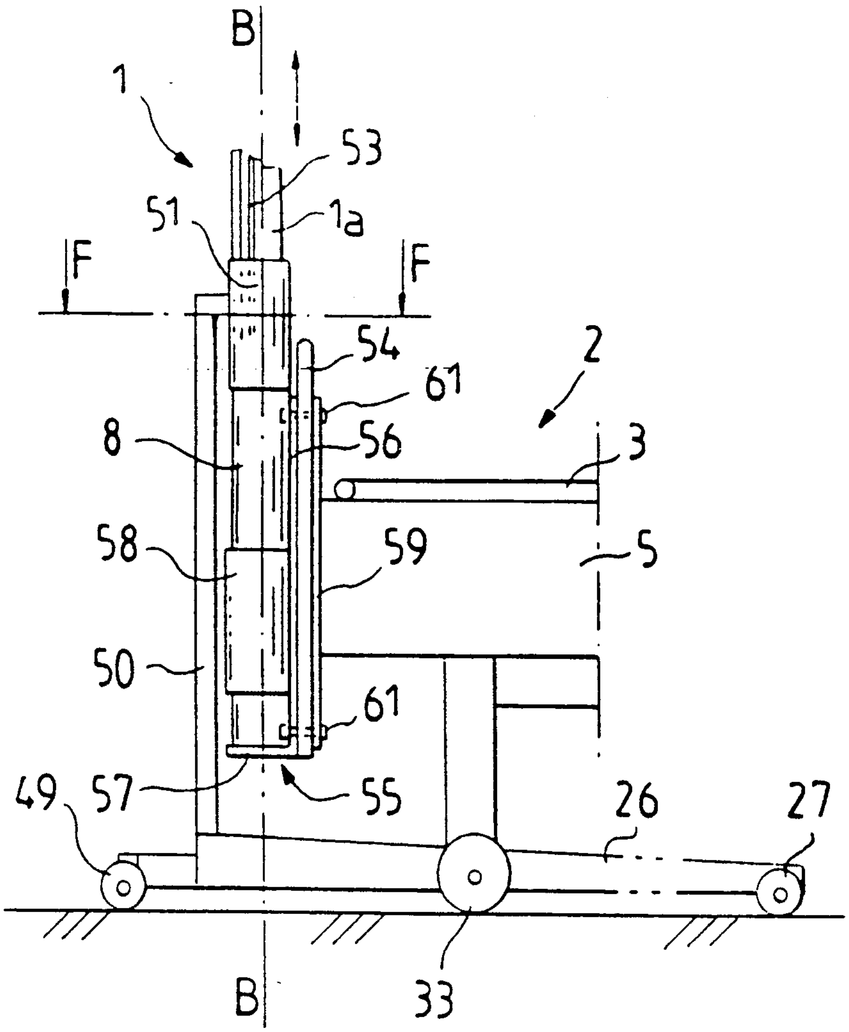
FIG. 10 is a partial illustration of a fourth apparatus of the invention.
Figure 11:
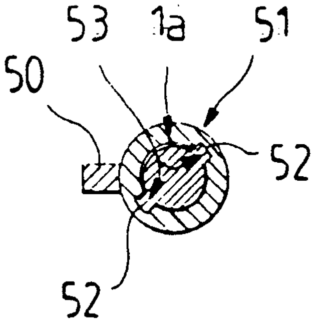
FIG. 11 is an illustration of the apparatus of FIG. 10, seen along the section F—F.

FIG. 10 is a partial illustration of a fourth embodiment the present invention. In this case the bed 2 comprises the bed bottom 5 and the bed frame 6, which are interconnected without any hauling device. Thus the bed structure conforms to that of FIG. 2.

The support frame 1, particularly its first part, are connected to a hydraulic cylinder 8, whereby the support frame, the couch connected thereto by straps 4, and the patient can be lifted in the same fashion as was explained in relation to FIG. 2. In connection to the support frame 1, there is arranged an auxiliary support 26, which is provided with rollers 27 and 49. The auxiliary support 26 is attached to the support frame 1 so that it is parallel to the second end 1*b* of the support frame and turns along with the frame, with respect to the vertical axis B—B.

The auxiliary support 26 is fastened, by means of a vertical support 50 and a sleeve 51 or other collar-like member, to the first part 1*a* of the support frame 1. The support frame 1 and the sleeve 51 are so matched, that the first end 1*a* of the support frame can move in the vertical direction within the sleeve 51 during a lifting or lowering operation. On the other hand, the countersurfaces of the sleeve 51 and the first part 1*a* of the support frame are provided with at least one vertical groove and bracket, whereby the horizontal rotating motion of the support frame 1 around the vertical axis B—B is transmitted to the vertical support 50 and further to the auxiliary support 26, so that the second part of the support frame and the auxiliary support 26 are turned simultaneously. In this case the platform 53 is arranged in the first part of the support frame and the groove 52 is arranged on the inner surface of the sleeve 51.

Figure 12:
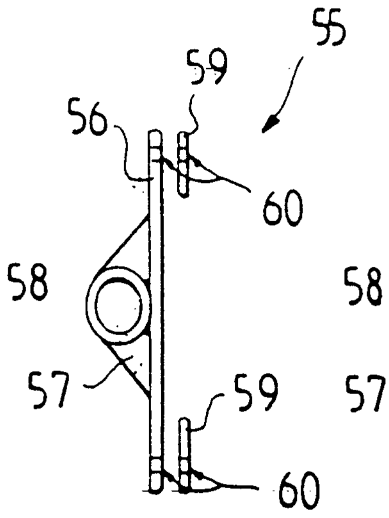
FIG. 12 is a top-view illustration of the fastening member for fastening the apparatus of FIG. 10 to a bed.
Figure 13:
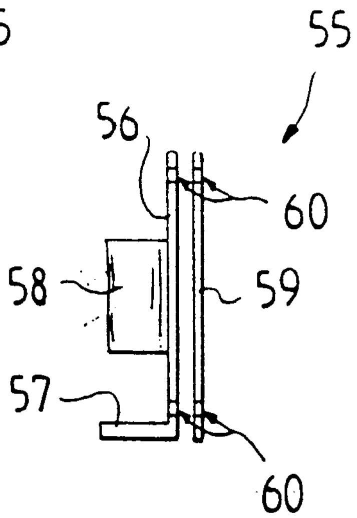
FIG. 13 is a side-view illustration of the same fastening member.

The cylinder 8, together with connected equipment, can be fastened detachably to the head 54 of the bed 2 by means of coupling members. In this case the coupling members comprise a support 55, which is illustrated in detail in FIGS. 12 and 13. The support 55 is formed of a support plate 56, a bottom plate 57 and a collar-like member 58 provided in connection with these two for fastening the cylinder 8, and of at least one back plate 59. In the support plate 56 and in the back plates 59 there are arranged corresponding holes 60 at suitable distances from each other, through which holes the fastening bolts 61 are inserted.

The support 55 is attached to the head of the bed so that the head 54 of the bed is fitted in between the support plate 56 and the back plate 59, and by means of the bolts 61 the support plate 56, the bed head 54 and the back plates 59 are pressed together.

Figure 14:
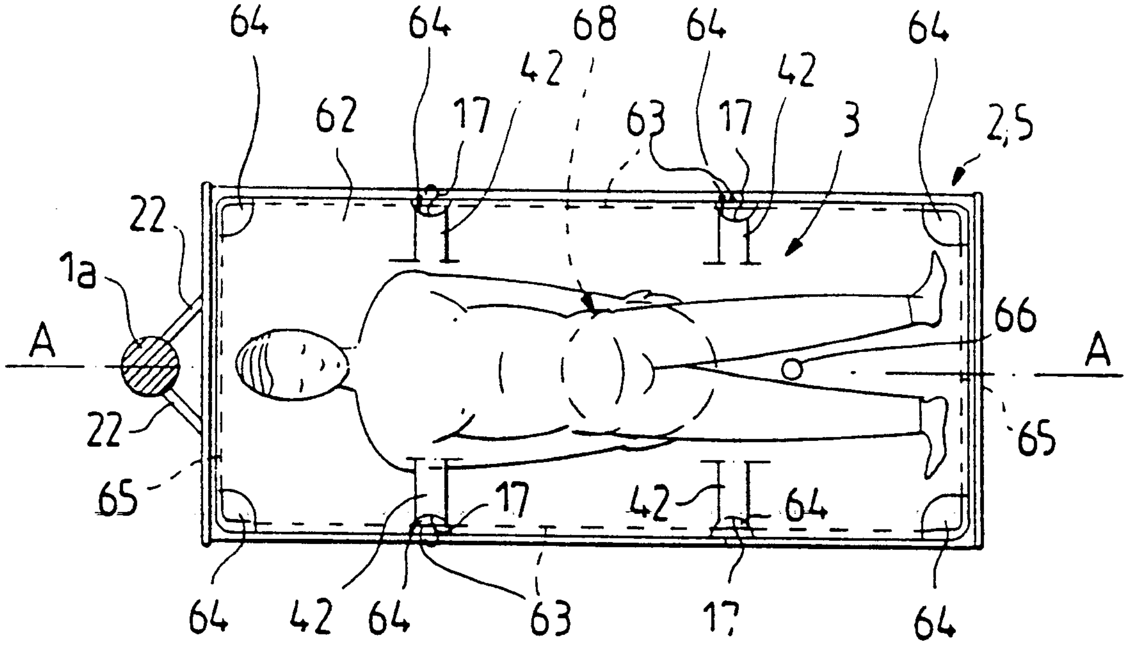
FIG. 14 is a top-view illustration of a couch.
Figure 15:
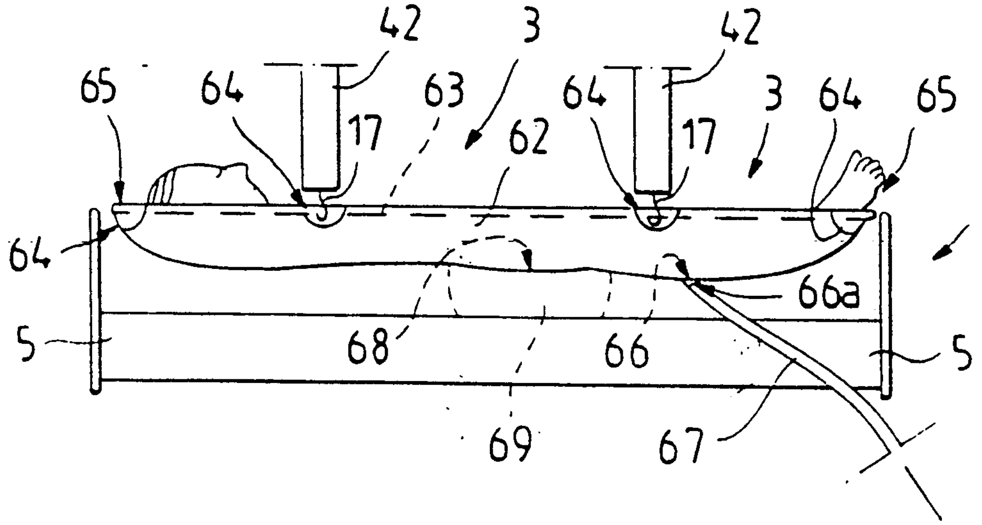
FIG. 15 is a side-view illustration of the couch on top of a bed.
Figure 18:
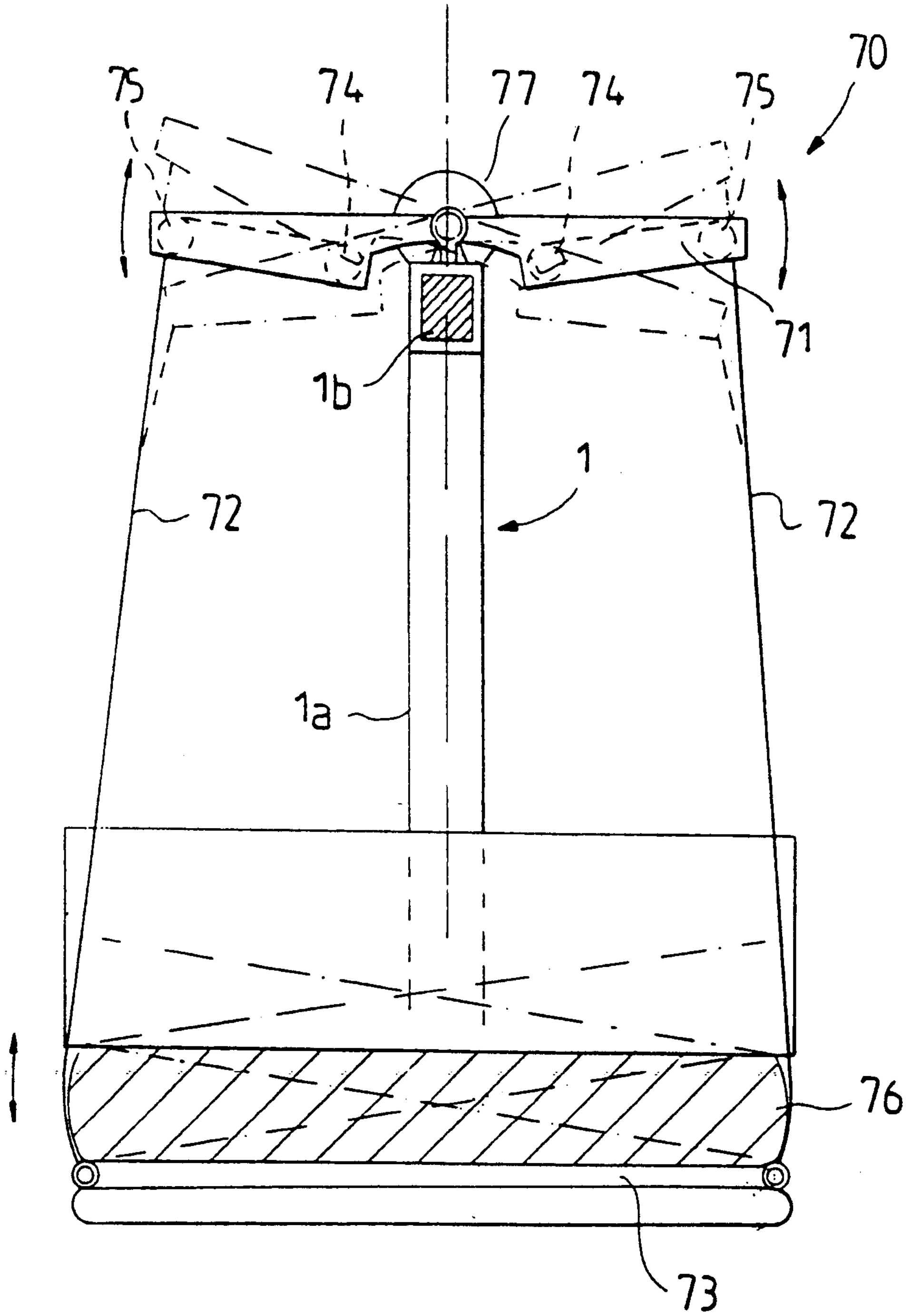
FIG. 18 illustrates a swing device.

FIGS. 14 and 15 illustrate a couch 3. The couch 3 comprises an underlay 62, which in all essential dimensions corresponds to the measures of the mattress of the bed 2, and support rails 63, which are installed along the long sides of the underlay 62. The support rails 63 are most advantageously fastened detachably to the underlay 62. Thus the long sides of the underlay are folded on top of the underlay and fastened thereto, so that there are formed tubular passages, whereto the support rails are easily inserted. In order to fasten the hooks 17 of the straps 42, there are arranged apertures 64 at the edges of the underlay 62. Thus the hooks 17 can be easily slid through the apertures 64 and fastened to the support rails 63.

In their middle section, the support rails 63 are advantageously provided with articulations 83 and locking sleeves 84, as is apparent from FIG. 16. In this drawing, the two parts of the support rail are indicated with symbols 63*a* and 63*b*. In between these parts there is placed the articulation 83. The inner diameter of the locking sleeve 84 is arranged to be such that the sleeve slides freely along the support rail 63; 63*a*, 63*b*. In connection to the first part 63*a* of the support rail there is arranged a back piece 85, whereto the locking sleeve 84 can be fastened so that it extends over the articulation 83 from the first part 63*a* of the support rail to the second part 63*b*. The locking sleeve 84 can be attached to the back piece 85 by means of a crimp connection, i.e. the sleeve 84 is simply pushed around the back piece 85 and is locked in place by friction. On the other hand, the end of the locking sleeve 84 can be provided with inner threadings 84*a*, and respectively the back piece 85 can be provided with outer threadings 85*a* so that the locking sleeve 84 can be fastened to the back piece 85 by means of a threaded coupling.

By employing the sleeves 84, the support rails 63 are locked throughout their whole length to be rigid, and are respectively released, in which case the support rails can be folded. The couch 3 together with the support rails 63 can thus be permanently installed in the bed. The bed and the patient can be lifted to sitting position by releasing the articulations 83 from the locking sleeves 84, in which case the support rails 63; 63*a*, 63*b* can be bent at the articulation to the same angle as the bed.

In this case the couch 3 is at all edges provided with detachably connectable support rails 63, 65 (FIG. 14). The short support rails 65 are fitted in the heads of the underlay 62 in a similar fashion as the lengthwise support rails 63 along the long edges of the underlay. The support rails 63, 65 thus form a framework around the underlay 62. Owing to this framework, the underlay 62 and the connected support rails cannot press the sides of the patient while the patient is being transported by the apparatus of the invention.

The underlay 62 of the couch 3 can be manufactured of various different materials, such as woven fabric or net. FIG. 17 illustrates a couch 3, the underlay 86 whereof is made of net. The essential point in choosing the material is to find an underlay which can be left in the bed under the patient, and does not necessarily have to be removed. Thus the hauling operations are naturally carried out more easily, because the underlay is always ready in the bed, under the patient.

The couch 3 can, with suitable modifications, be used as a shower base. Then the underlay 62 is made of some waterproof material. The underlay 62 is provided with a hole 66, which is most advantageously located in the middle area of the underlay. To this hole 66 there can be connected a hose 67 by means of for instance a regular bayonet catch 66*a*. From the opening of the underlay 62, the hose 67 can be further connected to a sewer or other vessel where the washing water can be collected.

Most advantageously the hole 66 is placed in the underlay 62 so that it will be located near the bottom part of the patient's body, most advantageously near the foot of the bed, at the point which is lowest when the patient is resting on the transfer device above the bed, as is illustrated in FIG. 15. When necessary, the couch 3 can, however, be inclined so that the patient's head rises higher than his feet. This procedure ensures that while the patient is being washed, the water flows through the opening 66 of the underlay 62 to the hose 67 and further out.

As an alternative, the underlay 62 of the couch 3 can be provided with another hole 68, which is larger than the above mentioned hole 66. This modification is illustrated by a dash line in FIGS. 14 and 15. The hole 68 is placed in the underlay 62 more or less at a spot where the patient's buttocks lie while the patient is resting on the couch 3. This hole 68 is used for collecting the patient's secretions, i.e. urine and excrement. In this case the transfer device is used so that the patient is lifted on the couch 3 up to a distance from the bed bottom 5, and the bedpan 69 is set under the second hole 68, where the patient can relieve himself. This arrangement means a remarkable improvement in the care of chronic patients in hospitals, because now the nurse does not have to lift the patient manually from bed and set the bedpan inconveniently in place.

In the apparatus of the invention, particularly in connection to its support frame 1, there can be installed means for measuring the weight of the patient. Thus the patient can be weighed with the same apparatus which is used for lifting and transporting him. For example at the turning point of the vertical, i.e. first frame part 1*a*, in between the turnable support frame and the stationary part, for instance in between the sliding bearing 23 and the tubular member 21 in FIG. 6, there can be installed a power sensor 79 for measuring the pressure power, by means of which sensor the total weight of the patient and the support frame 1 can be measured. The signal received from the power sensor is processed by means of a suitable processor 79*a*, such as a microprocessor, and the patient's weight is indicated for instance in a digital display 79*b*.

The equipment for measuring the patient's weight can be arranged in connection to a hydraulic cylinder, for instance in a connecting pipe 20, as is illustrated in FIG. 4. The equipment comprises a pressure sensor 80, which is subjected to the pressure of the cylinder space by intermediation of the connecting pipe 20, and a processor 81, whereby the measuring signal received from the pressure sensor is translated to weight units, such as kilos, and indicated for example in the display 82 of the processor 81. The processor 81 can be a separate device which is, when necessary, coupled to the pressure sensor 80 provided in connection to the hydraulic cylinder 8.

In the horizontal part 1*b* of the support frame 1 there can be arranged various auxiliary devices that have not been used earlier, and also devices that can be used in connection with the crossbeam fastened to a hospital bed. One of these new auxiliary devices, a device for moving the patient, i.e. a swing device 70, is introduced in FIG. 16.

The swing device 70 comprises a crossbar 71, straps 72 or the like members and a couch 73 which is arranged under the patient. The straps 72 are coiled on reels, in principle in the same fashion as was illustrated above, for instance in relation to FIGS. 6 and 7. The folding reels 75 are arranged at the free ends of the crossbar 71, and via them the straps, which in the rest position are coiled on the reels, are pulled down and fastened to the underlay 73 prior to using the swing device. The bearing of the crossbar 71 is in this case realized in a hinge-like fashion at the point 77*a* above the second part 1*b* of the support frame 1, in a direction at least roughly parallel to the lengthwise axis of the bed.

When the straps 72 are fastened to the couch 73 on both sides of the patient, and the swing device 70 is adjusted to a suitable place, in the middle area of the second part 1*b* of the support frame 1, the crossbar 71 can be swinged suspended from the support frame. The swinging motion is transmitted by intermediation of the suitably long straps 72 to the couch 73, which swings the mattress 76 on top of the couch and consequently the patient in the transversal direction of the bed. In that case the side supports of the bed can be lifted up in order to prevent the patient from falling from the bed. On the other hand, the angular motion of the swing device in between its extreme positions is suitably chosen, so that for the patient the risk of falling is nonexistent.

The swing device 70 is advantageously provided with an actuator such as a hydraulic cylinder or motor 77 for swinging the crossbar 71 and further for moving the patient.

By employing the above described swing device 70, choronic patients can every now and then be moved in order to improve their circulation. Particularly the moving of heavy patients has earlier been troublesome and required the work of several nurses. Moreover, the moving of heavy loads has caused spinal injuries for people working in the nursing field.

The above mentioned couch 73 can be formed of the earlier described couch 3. Accordingly, the swing device 70 can be realized in a similar fashion as the crossbar 35 described for instance in FIGS. 6 and 7. Then the horizontal part 1*b* of the support frame is at a suitable spot provided with a narrower sectin, or an area 90 which is round in cross-section, which area should correspond at least to the width a of the crossbar 35, as is illustrated in FIGS. 19 and 20. When the crossbar 35 is desired to be used as the swing device, it is shifted to the area 90, so that the crossbar 35 can move vertically in a swinging fashion, supported against the area 90.

Figure 21:
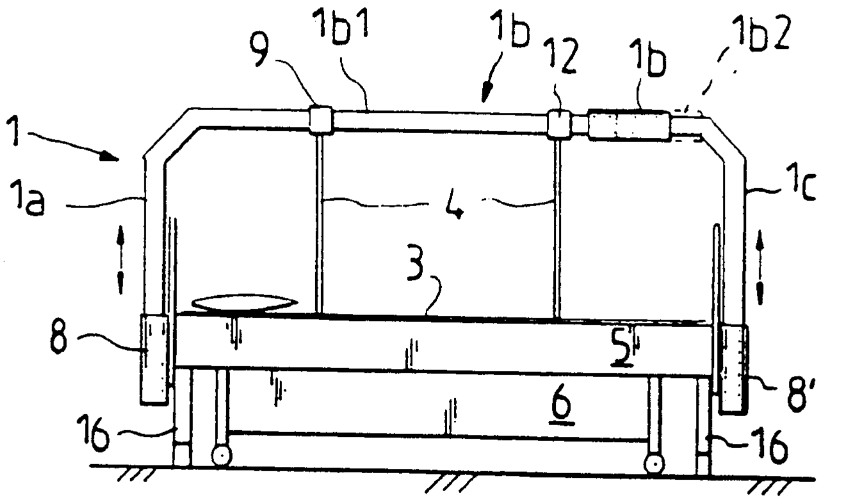
FIG. 21 is a side-view illustration of a bed and a fifth apparatus of the invention for transferring patients.
Figure 22:
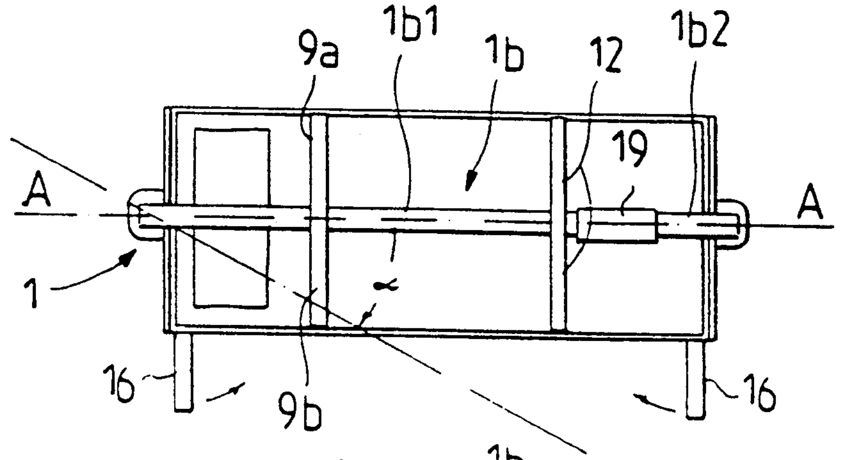
FIG. 22 is a top-view illustration of the bed and the apparatus of FIG. 21 for transferring patients.

FIGS. 21 and 22 represent another embodiment of the invention for transferring patients. In this embodiment, the support frame 1 is composed of the essentially vertical frame parts 1*a* and 1*c*, which are arranged at both heads of the bed 2 and are fastened to the hauling equipment, i.e. to the hydraulic cylinders 8 and 8'. Furthermore, the support frame 1 comprises an essentially horizontal frame part 1*b* divided into two sections 1*b*1 and 1*b*2, which are permanently connected to the frame parts 1*a* and 1*c* provided at the heads of the bed.

Figure 24:
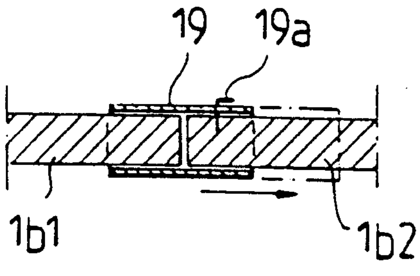
FIG. 24 illustrates a detail of the apparatuses of FIGS. 21, 22 and 23.

The sections 1*b*1 and 1*b*2 are joined by means of the sleeve 19 which is movable along the lengthwise direction of the frame part 1*b*. The sleeve 19 can be locked in the junction for instance by means of a pin 19*a*, as is illustrated in FIG. 24.

The first horizontal section 1*b*1 of the support frame 1 and the vertical part 1*a* correspond in structure to the frame parts 1*b* and 1*a* of FIGS. 6 and 7, for example. Thus the horizontal section 1*b*1 is turnable, after releasing the sleeve 19, sideways to an angle $\alpha$ with respect to the lengthwise axis A—A of the bed. This frame part 1*b*1 can be provided with all of the auxiliary devices that have been described above.

Figure 23:
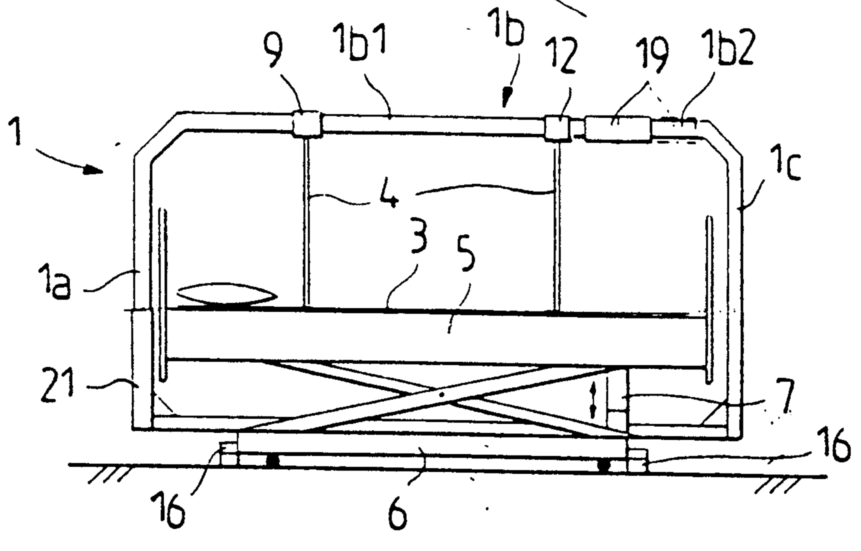
FIG. 23 is a side-view illustration of another bed and a sixth apparatus of the present invention for transferring patients which is connected to the bed.

As an alternative for the modification of the embodiment of FIGS. 21 and 22, the vertical frame parts 1*a* and 1*c* of the support frame 1 can be fastened to the bed frame 6 in a stationary fashion, as is illustrated in FIG. 23, provided that the bed bottom 5 is vertically adjustable in relation to the bed frame 6 (cf. FIG. 1). The lifting and lowering of the patient is carried out by lifting and lowering the bed bottom 5, so that the hauling device 7 pertaining to the bed is made use of. The horizontal section 1*b*1 and the vertical part 1*a*, together with connected equipment, can be turned, supported by the tubular member 21 (cf. FIG. 6), sideways to an angle $\alpha$ with respect to the lengthwise axis of the bed.

In this embodiment the couch 3 is similar as in the above described transfer devices according to the invention. The couch 3 is advantageously made of some flexible material, such as woven fabric or net. At the sides of the couch 3, on both sides of the bed 2, there can be fitted support rails 18 (cf. FIG. 3), whereto the ends of the straps 4 can be fastened while the patient is being moved.

In the above specification the invention has been described mainly with reference to a few preferred embodiments, but it is naturally clear that the invention can be modified in many ways within the inventional idea defined in the appended patent claims.

We claim:

1. An apparatus for transferring a patient, said apparatus comprising:

(a) a bed having a bed bottom and a bed frame;

(b) an elongate support frame connected to and extending above said bed;

(c) an underlay for extending beneath the patient; and (d) transfer means for moving the patient on the underlay; said transfer means being supported by said support frame; said transfer means including lifting means located between said support frame and said bottom of said bed such that said lifting means is operable to vertically adjust said support frame and said bed bottom with respect to each other; said support frame being directly connected to said bed frame and said bed bottom being vertically adjustable with respect to the bed frame; and said lifting means being operable to lift said bed bottom.

2. An apparatus for transferring a patient, said apparatus comprising:

(a) a bed having a bed bottom and a bed frame;

(b) an elongate support frame connected to and extending above said bed; said support frame being at least partially turnable essentially on the horizontal level with respect to a vertical axis;

(c) an underlay for extending beneath the patient;

(d) transfer means for moving the patient on the underlay; said transfer means being supported by said support frame; said transfer means including lifting means located between said support frame and said bottom of said bed such that said lifting means is operable to vertically adjust said support frame and said bed bottom with respect to each other;

(e) auxiliary support connected to the support frame such that the auxiliary support turns along with the support frame while the support frame is turned in relation to the vertical axis; said auxiliary support being attached to the support frame in a vertically turnable fashion, and in connection to the auxiliary support there are arranged means for securing the auxiliary support rigidly in place in the vertical direction, at least when the support frame is turned to an angle with respect to the lengthwise axis of the bed; and (f) locking means having an elongate member located between the auxiliary support and the bed frame, such that by intermediation of said member the auxiliary support and the bed frame in collaboration support the support frame while the patient is being transported.

3. An apparatus for transferring a patient, said apparatus comprising:

(a) a bed having a bed bottom and a bed frame;

(b) an elongate support frame connected to and extending above said bed;

(c) an underlay for extending beneath the patient; said underlay being attached with suspending members to the support frame at support points while the apparatus is in use, said support points of the suspending members being spaced apart with at least one of the support points remaining outside a straight line passing through two or more other said points; said suspending members being arranged on reels and said reels being loaded with springs so that in a rest position the suspending means are coiled on the reels from which reels the suspending means can be pulled out and fastened to the underlay; and (d) transfer means for moving the patient on the underlay supported by said support frame; said transfer means including lifting means located between said support frame and said bottom of said bed such that said lifting means is operable to vertically adjust said support frame and said bed bottom with respect to each other.

4. An apparatus for transferring a patient, said apparatus comprising:

(a) a bed having a bed bottom and a bed frame;

(b) an elongate support frame connected to and extending above said bed;

(c) an underlay for extending beneath the patient, said underlay being of a flexible material and in all essential dimensions corresponds to the mattress of the bed; and said underlay further including support rails fitted along the long edges of said underlay; and said underlay being provided with an opening located in the middle area of the underlay and constructed and arranged such that a hose can be connected to said opening; and (d) transfer means for moving the patient on the underlay supported by said support frame; said transfer means including lifting means located between said support frame and said bottom of said bed such that said lifting means is operable to vertically adjust said support frame and said bed bottom with respect to each other.

5. An apparatus for transferring a patient, said apparatus comprising:

(a) a bed having a bed bottom and a bed frame;

(b) an elongate support frame connected to and extending above said bed; said support frame being provided with a swing device including a crossbar and suspending members, said crossbar being attached to said support frame such that it turns in an essentially vertical fashion, and that said crossbar can selectively swing, suspended from the support frame; said swing device including an actuator for moving the crossbar and further the patient;

(c) an underlay fastened to said support frame with said suspending members for extending beneath the patient; and (d) transfer means for moving the patient on the underlay supported by said support frame; said transfer means including lifting means located between said support frame and said bottom of said bed such that said lifting means is operable to vertically adjust said support frame and said bed bottom with respect to each other.

6. An apparatus for transferring a patient, said apparatus comprising:

(a) a bed having first and second opposite ends and having a bed bottom and a bed frame;

(b) an elongate support frame connected to and extending above said bed;

(c) an underlay for extending beneath the patient; and (d) transfer means for moving the patient on the underlay supported by said support frame; said transfer means including lifting means located between said support frame and said bottom of said bed such that said lifting means is operable to vertically adjust said support frame and said bed bottom with respect to each other; said support frame including essentially vertical frame parts arranged at both ends of the bed, and a connecting, essentially horizontal frame part; said vertical frame parts being directly connected to the bed frame, said bed bottom being vertically adjustable with respect to said bed frame, and said lifting means being operable to lift the bed bottom.

7. An apparatus for transferring a patient, said apparatus comprising:

(a) a bed having first and second opposite ends and having a bed bottom and a bed frame;

(b) an elongate support frame connected to and extending above said bed; said support frame including essentially vertical frame parts arranged at both ends of the bed, and a connecting, essentially horizontal frame part; said horizontal frame part being detachably fastened to the second vertical frame part, and said horizontal frame part being turnable essentially on the horizontal level;

(c) an underlay for extending beneath the patient; and (d) transfer means for moving the patient on the underlay supported by said support frame; said transfer means including lifting means located between said support frame and said bottom of said bed such that said lifting means is operable to vertically adjust said support frame and said bed bottom with respect to each other.

8. An apparatus for transferring a patient, said apparatus comprising a support frame (1) with a first substantially vertical frame part (1*b*) and a second frame part (1*a*), which support frame is connected to a bed (2) and which vertical frame part (1*b*) extends above the bed; an underlay (3) for supporting the patient; and transfer means for moving the patient on the underlay (3) supported by the support frame (1), said transfer means comprises lifting means and suspending means for arranging the underlay (3) on the support of the first vertical frame part (1*b*) wherein the second frame part (1*a*) of the support frame (1) is connected to a bed frame (6), in which bed a surface (5) is vertically adjustable with respect to the bed frame (6), and that the employed lifting means is the lifting means (7) of the bed surface (5).

9. The apparatus of claim 8, wherein the second frame part (1*a*) of the support frame (1) is pivotally attached to the bed frame (6) so that the support frame (1) can be turned with respect to a vertical axis (B—B).

10. The apparatus of claim 9, wherein the transfer means include a swivelling device (78), whereby the support frame (1) can be turned.

11. The apparatus of claim 9, wherein the apparatus includes at least one auxiliary support (16), whereby the bed and the apparatus are supported during turning with respect to the vertical axis.

12. The apparatus of claim 11, wherein the auxiliary support (16; 26) is at least at a free end provided with one or more wheels (27), rollers or other similar members.

13. The apparatus of claim 9, wherein the apparatus includes an auxiliary support (26), which is connected to the support frame (1) so that the auxiliary support turns along with the support frame while the support frame is turned in relation to the vertical axis (B—B).

14. The apparatus of claim 13, wherein the auxiliary support (26) is attached to the support frame (1) in a vertically turnable fashion, and in connection to the auxiliary support there are arranged means for securing the auxiliary support rigidly in place in the vertical direction, at least when the support frame (1) is turned to an angle with respect to the lengthwise axis of the bed.

15. The apparatus of claim 14, wherein the said securing means comprise an elongate member (31), which is fitted in between the auxiliary support and the bed frame, and that by intermediation of said member the auxiliary support and the bed frame in collaboration support the support frame (1) while the patient is being transported.

16. The apparatus of claim 8, wherein the underlay (3) is attached with suspending means (4) in connection with the vertical frame part (1*b*) of the support frame (1) while the apparatus is in use, and the suspending means are made of flexible unextensible parts with a predetermined length.

17. The apparatus of claim 16, wherein a set of support points (C, D, E) of the suspending means (4) in the support frame (1) are at a distance from each other, and that at least one (for instance C) of the support points remains outside a straight line passing through the other two or more points (for instance D, E).

18. The apparatus of claim 16, wherein the suspending means (4; 42) are arranged on reels (13) in connection with the first frame part (1*b*) of the support frame and the reels (13) are loaded with springs (14) so that in a rest position the suspending means (4; 42) are coiled on the reels (13), from which reels the suspending means can be pulled out and fastened to the underlay (3).

19. The apparatus of claim 16, wherein in connection to the first frame part (1*b*) of the support frame (1) there is arranged at least one crossbar (9), the arms (9*a*, 9*b*) whereof are at an angle with respect to the first frame part (1*b*), and which arms (9*a*, 9*b*) are connectable to the underlay (3) by means of suspending means (4) while moving the patient.

20. The apparatus of claim 19, wherein the crossbar (9) is attached to the support frame (1) by means of fastening members (36, 37, 38, 39) so that the crossbar can be moved along the support frame (1) and locked at a desired spot.

21. The apparatus of claim 19, wherein the arms (9*a*, 9*b*) of the crossbar (9) are provided with articulations (10).

22. The apparatus of claim 19, wherein each arm (9*a*, 9*b*) is formed of a number of telescopically nested members (9*a*', 9*a*'').

23. The apparatus of claim 8, wherein in connection to a free end of the first frame part (1*b*) there is provided at least one auxiliary member (11) whereby the first frame part (1*b*) can be extended.

24. The apparatus of claim 8, wherein the underlay (3) includes an sheetlike member (62), which is made of some flexible material and in all essential dimensions corresponds to the mattress of the bed; and support rails (63), which are fitted along the long edges of the sheetlike member.

25. The apparatus of claim 24, wherein each support rail (63; 63*a*, 63*b*) is provided with an articulation (83) and with a locking sleeve (84), whereby the support rail can be locked to form a uniform, rigid pole.

26. The apparatus of claim 24, wherein the underlay (3) is on all sides provided with detachably interconnected support rails (63; 65), which form a framework around the sheetlike member (62; 86).

27. The apparatus of claim 24, wherein the sheetlike (86) is made of net.

28. The apparatus of claim 24, wherein the sheetlike member (62) is made of some waterproof material.

29. The apparatus of claim 28, wherein the sheetlike member (62) is provided with an opening (66; 68) which is most advantageously located in the middle area of the underlay.

30. The apparatus of claim 29, wherein to the opening (66) there can be connected an outlet hose (67).

31. The apparatus of claim 8, wherein in connection to the second frame part (1*a*) there are arranged means (79, 79*c*, 79*b*; 80, 81, 82) for measuring the weight of the patient.

32. The apparatus of claim 8, wherein the first frame part (1*b*) is provided with a swing device (70) comprising a crossbar (71) and suspending members (72), the said crossbar (71) being attached to the support frame (1) so that it turns in an essentially vertical fashion, and that the crossbar can be swinged, suspended from the support frame (1), and that the said suspending members (72) can be fastened to the underlay (73) which is arranged under the patient.

33. The apparatus of claim 32, wherein the swing device (70) comprises an actuator (77) for moving the crossbar (71) and further the patient.

34. The apparatus of claim 32, wherein the sheetlike member (73) is arranged in the bed, under the mattress.

35. The apparatus of claim 8, wherein the support frame (1) comprises essentially vertical frame parts (1*a*, 1*c*) arranged at both ends of the bed (2), and a connecting, essentially horizontal frame part (1*b*) and that the vertical frame parts (1*a*, 1*c*) are directly connected to the bed frame (6).

36. The apparatus of claim 35, wherein the horizontal frame part (1*b*1) is detachably fastened to the second vertical frame part (1*c*), and that the horizontal frame part (1*b*1) is turnable essentially on the horizontal level.

* * * * *

UNITED STATES PATENT AND TRADEMARK OFFICE

CERTIFICATE OF CORRECTION

PATENT NO. : 5,005,233

DATED : April 9, 1991

INVENTOR(S) : Ikka Toivio, Terttu Tolvio

It is certified that error appears in the above-identified patent and that said Letters Patent is hereby corrected as shown below:

In the Abstract, line 10, delete "essentailly" and insert --essentially--.

Column 2, line 41, delete "pheumatic" and insert --pneumatic--.

Column 4, line 17, delete "nest" and insert --nested--.

Column 4, line 49, delete "matress" and insert --mattress--.

Column 14, line 6, delete "600 " and insert --60--.

Column 16, line 8, insert --2-- after the word "bed".

Signed and Sealed this

First Day of December, 1992

*Attest:*

DOUGLAS B. COMER

*Attesting Officer* — *Acting Commissioner of Patents and Trademarks*